US012568189B2

(12) United States Patent
Mitchell

(10) Patent No.: US 12,568,189 B2
(45) Date of Patent: Mar. 3, 2026

(54) PLATFORM-AGNOSTIC VIDEOCONFERENCE METACOMMUNICATION SYSTEM

(71) Applicant: T-Mobile USA, Inc., Bellevue, WA (US)

(72) Inventor: Michael Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 227 days.

(21) Appl. No.: 18/480,481

(22) Filed: Oct. 3, 2023

(65) Prior Publication Data

US 2025/0113012 A1     Apr. 3, 2025

(51) Int. Cl.
*H04N 7/15*        (2006.01)
*H04N 7/14*        (2006.01)

(52) U.S. Cl.
CPC ............. *H04N 7/152* (2013.01); *H04N 7/147* (2013.01)

(58) Field of Classification Search
CPC ... G06F 1/1686; G06F 11/1443; G06V 40/28; H04L 12/1827; H04L 65/1069; H04L 65/1083; H04L 65/403; H04L 67/54; H04N 7/147; H04N 7/15; H04N 7/152; H04N 7/157; H04N 23/611; G03H 1/2294; G06Q 20/4014; H04M 3/56; H04M 3/567
See application file for complete search history.

(56) References Cited

U.S. PATENT DOCUMENTS

| | | | |
|---|---|---|---|
| 5,991,276 A | 11/1999 | Yamamoto | |
| 6,037,970 A | 3/2000 | Kondo | |
| 6,847,403 B1 | 1/2005 | Forsberg et al. | |
| 7,308,476 B2 * | 12/2007 | Mannaru | H04L 67/54 |
| | | | 348/E7.083 |
| 7,362,349 B2 | 4/2008 | Nelson et al. | |
| 7,391,432 B2 | 6/2008 | Terada | |

(Continued)

FOREIGN PATENT DOCUMENTS

| | | |
|---|---|---|
| CN | 1875609 A | 12/2006 |
| CN | 1949809 A | 4/2007 |

(Continued)

*Primary Examiner* — Gerald Gauthier
(74) *Attorney, Agent, or Firm* — Perkins Coie LLP

(57)        ABSTRACT

The technology includes a system to assist and enrich a videoconference session with metacommunication channels provided by a metacommunication service. The metacommunication service is hosted by a server of the system to function across different videoconference platforms. The system streams a metacommunication channel to multiple client devices of participants of a videoconference session. The metacommunication channel is configured to generate a video feed that modifies a camera feed of the videoconference session based on metacommunicative signals. The system generates first metacommunicative signals based on an output of a software application. The system enables a device connected to the videoconference session to access the server of the system and cause the metacommunicative service to generate second metacommunicative signals. The system updates the metacommunication channel based on the first metacommunicative signals and the second metacommunicative signals.

20 Claims, 5 Drawing Sheets

(56) References Cited

U.S. PATENT DOCUMENTS

| | | | | |
|---|---|---|---|---|
| 7,499,075 | B2 | 3/2009 | Miceli | |
| 7,558,221 | B2 | 7/2009 | Nelson et al. | |
| 8,120,638 | B2 | 2/2012 | Kenoyer | |
| 8,120,639 | B2 * | 2/2012 | Barry | H04N 7/15 |
| | | | | 348/14.09 |
| 8,125,511 | B2 * | 2/2012 | Lam | H04N 7/15 |
| | | | | 348/14.09 |
| 8,208,000 | B1 | 6/2012 | Swanson et al. | |
| 8,427,522 | B2 | 4/2013 | Khot et al. | |
| 8,446,455 | B2 * | 5/2013 | Lian | H04N 7/15 |
| | | | | 348/14.09 |
| 8,456,509 | B2 | 6/2013 | Khot et al. | |
| 8,487,975 | B2 | 7/2013 | King et al. | |
| 8,553,065 | B2 * | 10/2013 | Gannu | H04M 3/567 |
| | | | | 348/14.09 |
| 8,587,634 | B1 * | 11/2013 | Baldino | H04N 7/15 |
| | | | | 348/14.09 |
| 8,659,639 | B2 * | 2/2014 | Baldino | H04N 7/15 |
| | | | | 348/14.02 |
| 8,665,307 | B2 * | 3/2014 | Setton | H04N 7/157 |
| | | | | 348/14.02 |
| 8,749,610 | B1 * | 6/2014 | Gossweiler | H04L 12/1827 |
| | | | | 348/14.09 |
| 8,890,929 | B2 * | 11/2014 | Paithankar | H04N 7/152 |
| | | | | 709/204 |
| 9,330,295 | B2 | 5/2016 | Dunn | |
| 9,560,206 | B2 | 1/2017 | Jones et al. | |
| 9,641,559 | B2 | 5/2017 | Maistri et al. | |
| 9,723,265 | B2 | 8/2017 | Liu | |
| 9,749,584 | B2 | 8/2017 | Martinez et al. | |
| 9,866,795 | B2 | 1/2018 | Caldwell | |
| 9,891,803 | B2 | 2/2018 | Scott et al. | |
| 10,264,215 | B1 * | 4/2019 | Sadanand | G06Q 20/4014 |
| 10,477,148 | B2 | 11/2019 | Bright-Thomas et al. | |
| 10,554,931 | B1 | 2/2020 | Zavesky et al. | |
| 11,153,532 | B1 | 10/2021 | Gupta et al. | |
| 11,350,058 | B1 | 5/2022 | Swierk et al. | |
| 11,350,059 | B1 | 5/2022 | Swierk et al. | |
| 11,423,470 | B1 | 8/2022 | Boyd | |
| 11,445,128 | B2 | 9/2022 | Swierk et al. | |
| 11,463,270 | B2 | 10/2022 | Swierk et al. | |
| 2004/0008249 | A1 | 1/2004 | Nelson et al. | |
| 2004/0230655 | A1 | 11/2004 | Li et al. | |
| 2004/0236830 | A1 | 11/2004 | Nelson et al. | |
| 2005/0132412 | A1 | 6/2005 | Richardson et al. | |
| 2005/0264648 | A1 | 12/2005 | Ivashin et al. | |
| 2008/0307324 | A1 | 12/2008 | Westen et al. | |
| 2010/0085415 | A1 | 4/2010 | Rahman | |
| 2010/0283829 | A1 * | 11/2010 | De Beer | H04M 3/56 |
| | | | | 348/14.09 |
| 2011/0043600 | A1 * | 2/2011 | Gopal | H04L 65/403 |
| | | | | 348/14.09 |
| 2011/0069141 | A1 * | 3/2011 | Mitchell | H04L 65/1083 |
| | | | | 709/204 |
| 2011/0279631 | A1 | 11/2011 | Ranganath et al. | |
| 2012/0287228 | A1 * | 11/2012 | Mishra | G06F 11/1443 |
| | | | | 348/14.09 |
| 2013/0141515 | A1 * | 6/2013 | Setton | H04N 7/147 |
| | | | | 348/E7.083 |
| 2015/0201162 | A1 * | 7/2015 | Griffin | H04N 7/15 |
| | | | | 348/14.07 |
| 2015/0373303 | A1 * | 12/2015 | Visosky | H04N 23/611 |
| | | | | 348/14.05 |
| 2017/0359391 | A1 | 12/2017 | Pai et al. | |
| 2018/0039951 | A1 | 2/2018 | Wynn et al. | |
| 2019/0037171 | A1 * | 1/2019 | Nagpal | H04N 7/147 |
| 2021/0051035 | A1 * | 2/2021 | Atkins | H04L 12/1827 |
| 2021/0051036 | A1 * | 2/2021 | Atkins | H04L 65/403 |
| 2021/0181176 | A1 | 6/2021 | Acedo et al. | |
| 2022/0086393 | A1 * | 3/2022 | Peters | H04N 7/147 |
| 2022/0236782 | A1 | 7/2022 | Viswanathan Iyer et al. | |
| 2022/0239848 | A1 | 7/2022 | Swierk et al. | |
| 2022/0377059 | A1 | 11/2022 | Lyons et al. | |
| 2022/0414990 | A1 * | 12/2022 | Huang | H04L 65/1069 |
| 2023/0064328 | A1 | 3/2023 | Pitts et al. | |
| 2023/0077712 | A1 * | 3/2023 | Purnell | H04N 7/147 |
| | | | | 348/14.01 |
| 2023/0109787 | A1 * | 4/2023 | O'Leary | G06V 40/28 |
| | | | | 348/14.09 |
| 2023/0115098 | A1 | 4/2023 | Miller et al. | |
| 2023/0164202 | A1 * | 5/2023 | Kumar Agrawal | G06F 1/1686 |
| | | | | 348/14.03 |
| 2024/0205369 | A1 * | 6/2024 | Soechting | H04N 7/157 |
| 2025/0113012 | A1 * | 4/2025 | Mitchell | H04N 7/147 |

FOREIGN PATENT DOCUMENTS

| | | | |
|---|---|---|---|
| CN | 101631311 | A | 1/2010 |
| CN | 109819341 | B | 8/2021 |
| DE | 102013103556 | B4 | 10/2019 |
| EP | 1084580 | B1 | 4/2003 |
| EP | 1381237 | A2 | 1/2004 |
| EP | 1468559 | A1 | 10/2004 |
| EP | 0836324 | B1 | 12/2004 |
| EP | 2863632 | B1 | 8/2019 |
| EP | 3557501 | A1 | 10/2019 |
| EP | 3563248 | B1 | 11/2022 |
| EP | 3725105 | B1 | 9/2023 |
| JP | 2007274463 | A | 10/2007 |
| JP | 2007325063 | A | 12/2007 |
| KR | 100628186 | B1 | 9/2006 |
| KR | 20110003491 | A | 1/2011 |
| KR | 101026033 | B1 | 3/2011 |
| KR | 102056588 | B1 | 12/2019 |
| WO | 2012045058 | A2 | 4/2012 |
| WO | 2012141707 | A1 | 10/2012 |
| WO | 2015025189 | A1 | 2/2015 |
| WO | 2018104834 | A1 | 6/2018 |
| WO | 2021205240 | A1 | 10/2021 |

* cited by examiner

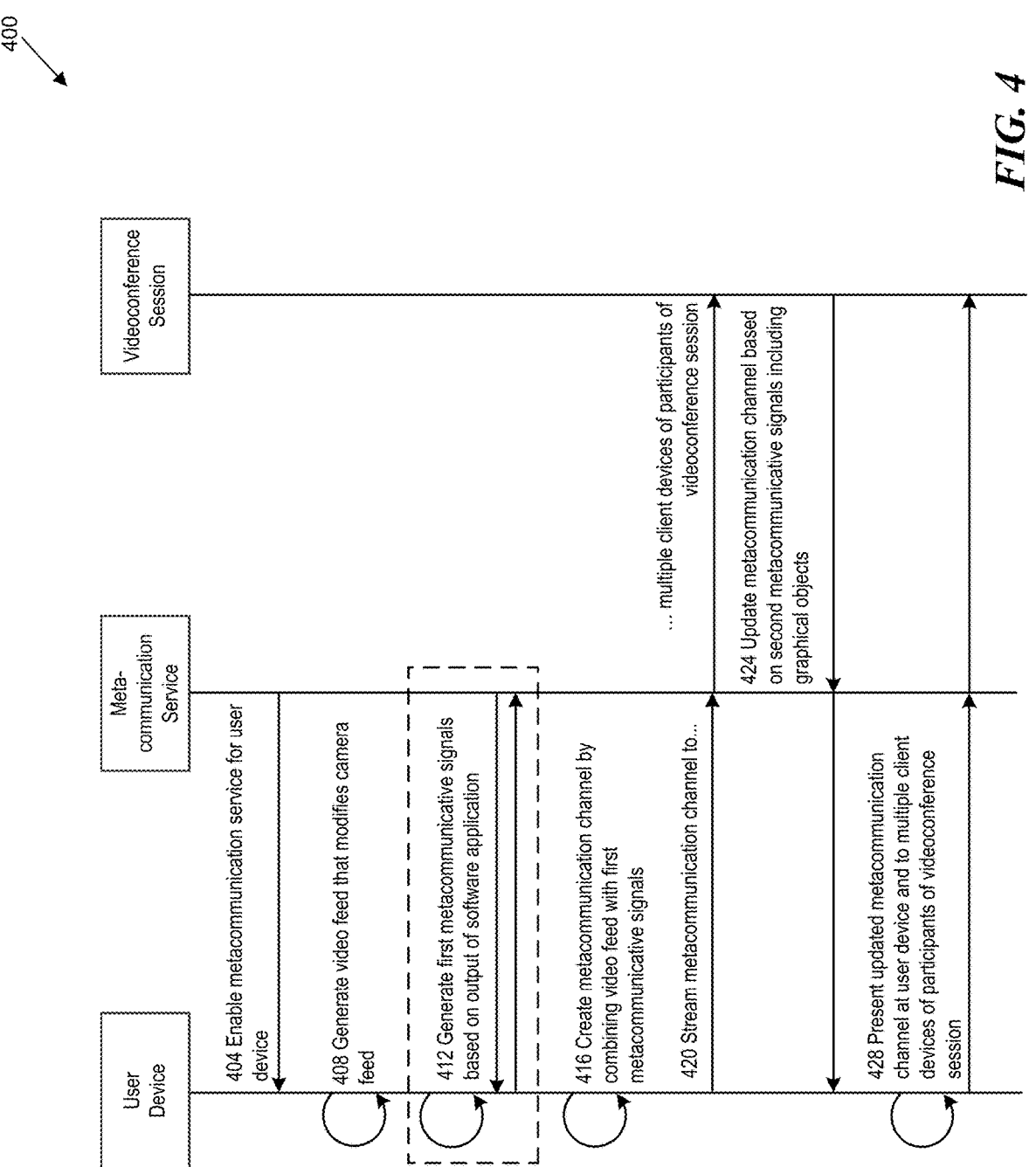

Videoconference Session

Meta-communication Service

User Device

404 Enable metacommunication service for user device

408 Generate video feed that modifies camera feed

412 Generate first metacommunicative signals based on output of software application 416 Create metacommunication channel by combining video feed with first metacommunicative signals 420 Stream metacommunication channel to...

... multiple client devices of participants of videoconference session

424 Update metacommunication channel based on second metacommunicative signals including graphical objects 428 Present updated metacommunication channel at user device and to multiple client devices of participants of videoconference session

500

PLATFORM-AGNOSTIC VIDEOCONFERENCE METACOMMUNICATION SYSTEM

BACKGROUND

Video conferencing is a technology that allows users in different locations to hold real-time face-to-face meetings. Video conferencing's main advantage over telephone conference calls is that users can see each other, which allows them to develop stronger relationships. There are a variety of ways video conferencing can be conducted. Individuals may use web cameras connected to or built into laptops, tablets, or desktop computers. Smartphones and other connected mobile devices equipped with cameras may also be used to connect for video conferences. In such instances, a software-based platform typically is used to transmit the communication over internet protocols.

BRIEF DESCRIPTION OF THE DRAWINGS

Detailed descriptions of implementations of the present invention will be described and explained through the use of the accompanying drawings.

FIG. 4 is a flow chart that illustrates a method to generate a metacommunication channel for videoconference sessions.

Figure 1:
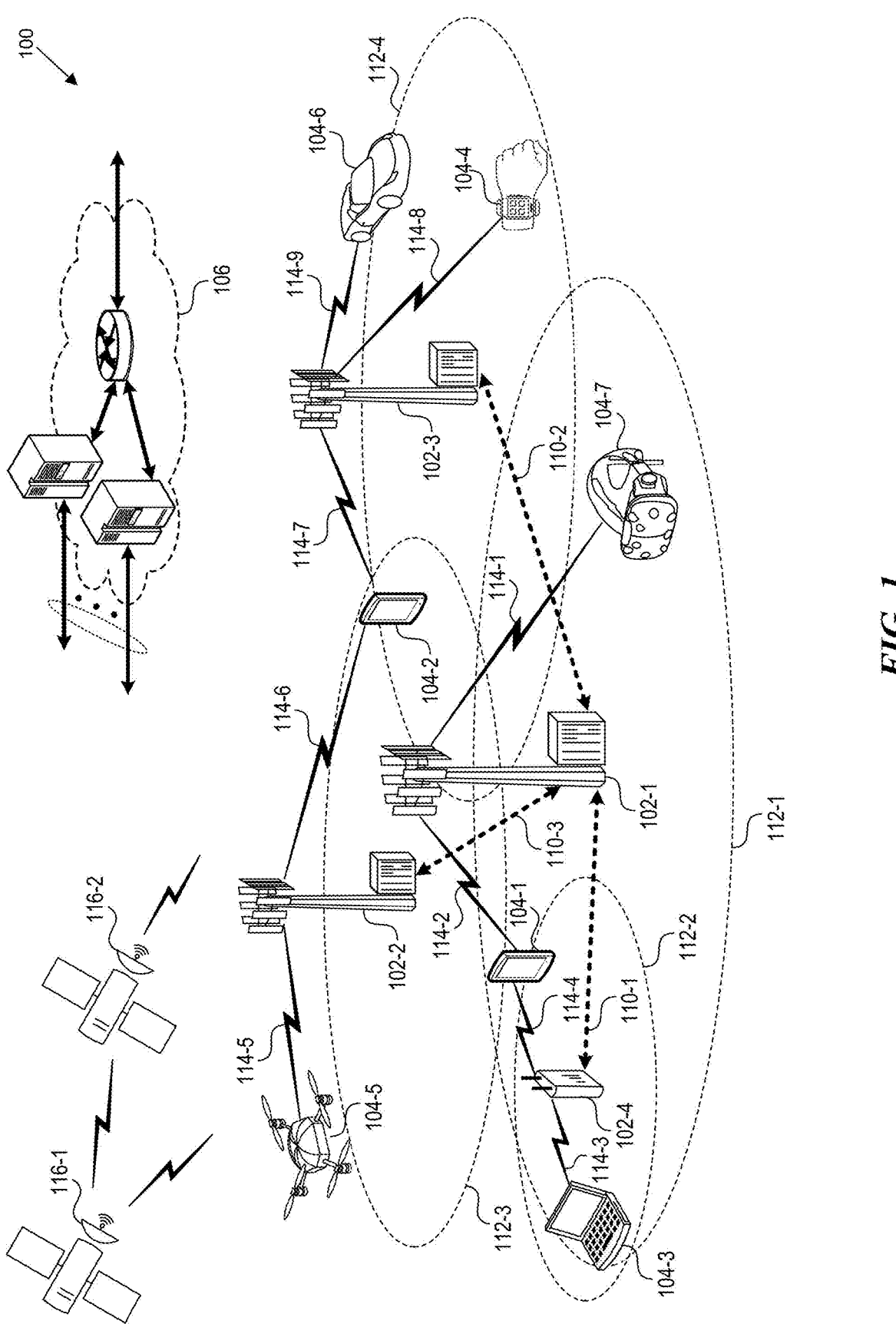
FIG. 1 is a block diagram that illustrates a wireless communications system that can implement aspects of the present technology.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes videoconference metacommunication systems that are platform-agnostic, e.g., independent of any specific videoconference platform (e.g., Zoom®, WebEx®, or Teams®). Metacommunication is communication that is secondary to a principal mode of communication, which occurs in parallel and relies on modalities outside of and beyond the primary modalities used in the principal mode of communication. Metacommunication can provide cues as to how a communication is meant to be interpreted. For example, in face-to-face boardroom meetings—of the kind a remote videoconference is designed to emulate-meeting members can use prosody, gestures, and facial expressions to communicate tone. An ironic tone can indicate that a member's intended meaning is the opposite of the denotative quality of the words constituting their speech.

In the disclosed technology, additional modalities of communication are enabled. These modalities include metacommunicative signals, such as integrated applications, interactive tools, and media to enrich any videoconferencing experience. In one example, the technology duplicates or augments a device's camera feed to create a metacommunication channel. The metacommunication channel can be configurable to include personalized settings informed by a user profile. The personalized settings can include superimposed media, sentiment analysis, automatic speech translation, as well as context recognition for automatic prompting and command suggestions. The metacommunication channel can function independently or as a part of a network of user profiles that are partially accessible to other users of the network.

The technology is platform agnostic because features of the integrated applications and media are integrated into captured video and/or audio, which is included in the videoconference session as a metacommunication channel. Moreover, the integrated media can include a metacommunication server that allows videoconference members to edit the metacommunicative signals associated with a particular user and update the metacommunication channel that is streamed to the videoconference session.

The disclosed technology solves the problem of social biases and norms that can limit access or hamper communication between members of a traditional in-person meeting or videoconference. For example, metacommunicative signals can include the pronunciation of a videoconference member's name—recorded by the videoconference member themselves—the videoconference member's preferred pronouns, the videoconference member's rank and role in a company, and other information that it wouldn't be possible to communicate in an in-person, face-to-face boardroom meeting, or in a traditional videoconference. As an additional example, metacommunicative signals can include live subtitles for speech, sign language, and translated text, as well as text-to-speech automatic decoding for such live subtitles for videoconference members who are prevented from reading live subtitles, e.g., from a visual impairment.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security applications, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different application environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have application subscriptions with a wireless network 100 application provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have application subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver applications anywhere and anytime and provide coverage in areas that are unreachable by any conventional Terrestrial Network (TN). A 6G implementation of the network 100 can support terahertz (THz) communications. This can support wireless applications that demand ultrahigh quality of application (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Videoconference Metacommunication Systems

Figure 2:
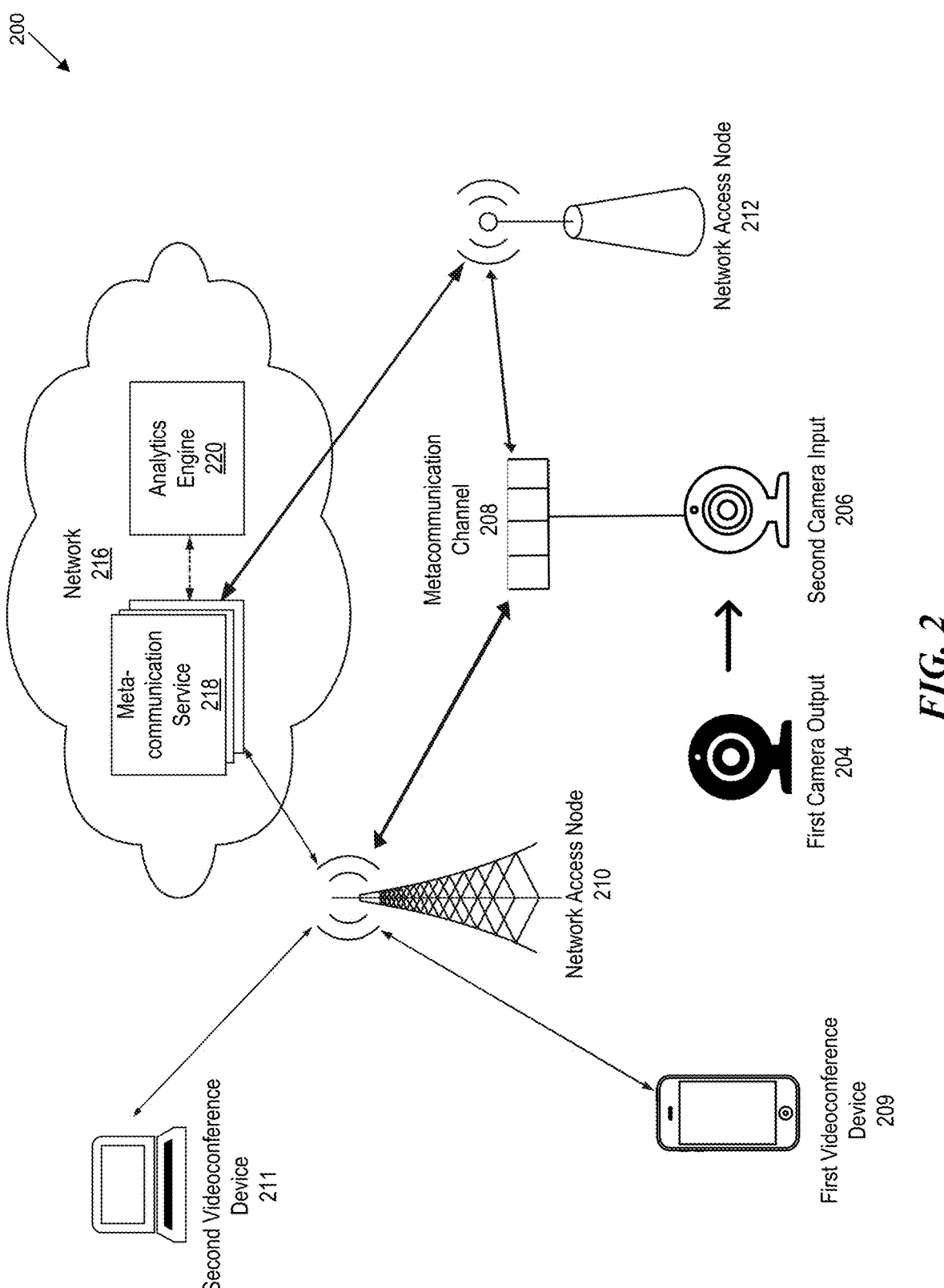
FIG. 2 is a block diagram that illustrates an example videoconference metacommunication system configured to assist and enrich videoconference communication independent of videoconferencing platform.

FIG. 2 is a block diagram that illustrates a videoconference metacommunication system 200 configured to assist and enrich videoconference communication independent of videoconferencing platform. The system 200 includes a metacommunication service 218 that has been enabled for a user. In some embodiments, the videoconference metacommunication service 218 is administered by a telecommunications network. The metacommunication service 218 can run on the network 216 or locally on a device associated with the user, or as a combination of local and cloud processes. The videoconference metacommunication system 200 includes a first camera output 204 captured by a camera device, as well as a second camera input 206 instantiated by the system based on the first camera output 204. The second camera input 206 and the first camera output 204 operate as separate camera inputs in the system 200. The camera device can include a microphone, as well as other sensors (e.g., a 3D camera). The second camera input 206 can be a duplicate of the first camera output 204, or it can be a processed, altered, or enhanced version of the first camera output 204.

The videoconference metacommunication system 200 generates metacommunicative signals for videoconferencing. The metacommunicative signals are associated with the user and include an output of an application, graphical content administered by the videoconference metacommunication service, or both. The metacommunicative signals can be generated by the user, by an administrator of the videoconference metacommunication service 218, or by other users of the videoconference metacommunication service 218. The metacommunicative signals will be explored in greater detail in the description of FIG. 3.

The videoconference metacommunication system 200 administers the metacommunicative signals at a metacommunication server that is accessible to members of a videoconferencing session. The metacommunication server can be located on the network 216, at the metacommunication service 218 or on a cloud repository, or it can be hosted on the device associated with the user, or it can be hosted in a distributed fashion among one or more of the devices of the system, which have been described in the foregoing and will be described below.

The videoconference metacommunication system 200 generates a metacommunication channel 208 that is associated with the user by combining the metacommunicative signals with the second camera input 206. The metacommunicative signals can be combined with the second camera input 206 by superimposing the signals over the second camera input 206. The metacommunication channel functions as a separate camera input from the first camera output 204. The videoconference metacommunication system 200 streams the metacommunication channel 208 in place of the first camera output 204 to a first videoconference device 209 for a first member of a first videoconferencing session. The first videoconference device 209 can be one of a set of first videoconference devices that are associated with first members of a first videoconferencing session that is hosted by a first videoconferencing platform. In some embodiments, the videoconference metacommunication system 200 streams the metacommunication channel 208 directly to the first videoconference device. In further embodiments, the videoconference metacommunication system 200 streams the metacommunication channel 208 to the first videoconference device 209 via one or more network access nodes 210 and 212. In one example, the videoconference metacommunication system 200 uploads the stream of the metacommunication channel 208 to the network 216 via the network access node 212. Continuing this example, the first videoconference device 209 downloads the stream of the metacommunication channel 208 from the network 216 via the network access node 210.

In some embodiments, the videoconference metacommunication system 200 streams the metacommunication channel to a second videoconferencing device 211. The second videoconference device 209 can be one of a set of second videoconference devices that are associated with second members of a second videoconferencing session that is hosted by a second videoconferencing platform. The second videoconferencing platform is different from the first videoconferencing platform. The first and second videoconferencing platforms can be running on separate devices, or on the same device, i.e., the first videoconference devices and the second videoconference devices can be exclusive (as illustrated) or non-exclusive groups. In the latter case, multiple videoconference platforms can stream the metacommunication channel 208 on the same device. The second videoconferencing session can occur synchronously or asynchronously with the first videoconferencing session, and the second members and the first members can be non-exclusive groups. Additional embodiments can include more video-conferencing platforms, videoconferencing sessions, members of videoconferencing sessions, as well as devices that are receiving the metacommunication channel 208 stream.

In some embodiments, the videoconference metacommunication system 200 enables a member of the first members (e.g., participants) of the first videoconferencing session to update the metacommunication channel. The videoconference metacommunication system 200 can enable the member by providing the member with access to the metacommunication server. Additional methods of providing access to the metacommunication server will be explored in the description of FIG. 3. In such an embodiment, upon accessing the metacommunication server, the videoconference metacommunication system 200 the grants the member permission to edit the metacommunicative signals of the user.

Upon editing the metacommunicative signals of the user, the videoconference metacommunication system 200 causes the first videoconferencing session to update the metacommunication channel 208 according to the changes made by the member. This is done such that the changes are presented to the first members during the first videoconferencing session. The updated metacommunication channel can replace the metacommunication channel 208 after such a delay that corresponds to the connection speed of the first videoconference device 209, the network access nodes 210 and 212, and the network 216.

In some embodiments, the videoconference metacommunication system 200 includes an analytics engine 220. The analytics engine 220 can include machine learning models (e.g., for the purpose of face detection, object detection, sentiment analysis, and/or automatic speech translation). In such embodiments, the machine learning models output predictions, classifications, and recommendations based on the second camera input, as well as other device input (e.g., a microphone). as an input, and. change the output based on changes in the second camera input to produce responsive metacommunication signals; and update the metacommunication channel to display the responsive metacommunication signals. The analytics engine 220 can include a video conference assistant that is connected to the machine learning models, e.g., a context recognition model for automatic prompting and command suggestions. In one example, the output of the machine learning models includes a heat map measuring the relative significance of areas included within the second camera input. Continuing with this example, the metacommunicative signals have a position that is determined based on the heat map. That is, analytics engine 220 uses the machine learning models to dynamically position the metacommunicative signals so as to avoid occluding regions of interest (e.g., the face of the user).

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model can be a neural network with multiple input nodes that receive a camera feed or a microphone feed. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as metacommunicative signals for a metacommunication channel. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

A machine learning model can be trained with supervised learning, where the training data includes camera feeds or microphone feeds as input and a desired output, such as metacommunicative signals for a metacommunication channel (e.g., face detection, sentiment analysis, or automatic speech recognition and live translation). A representation of a metacommunication signal can be provided to the model. Output from the model can be compared to the desired output for that metacommunication channel and, based on the comparison, the model can be modified, such as by changing weights between nodes of the neural network or parameters of the functions used at each node in the neural network (e.g., applying a loss function). After applying each of the metacommunicative signals in the training data and modifying the model in this manner, the model can be trained to evaluate new metacommunicative signals.

Figure 3:
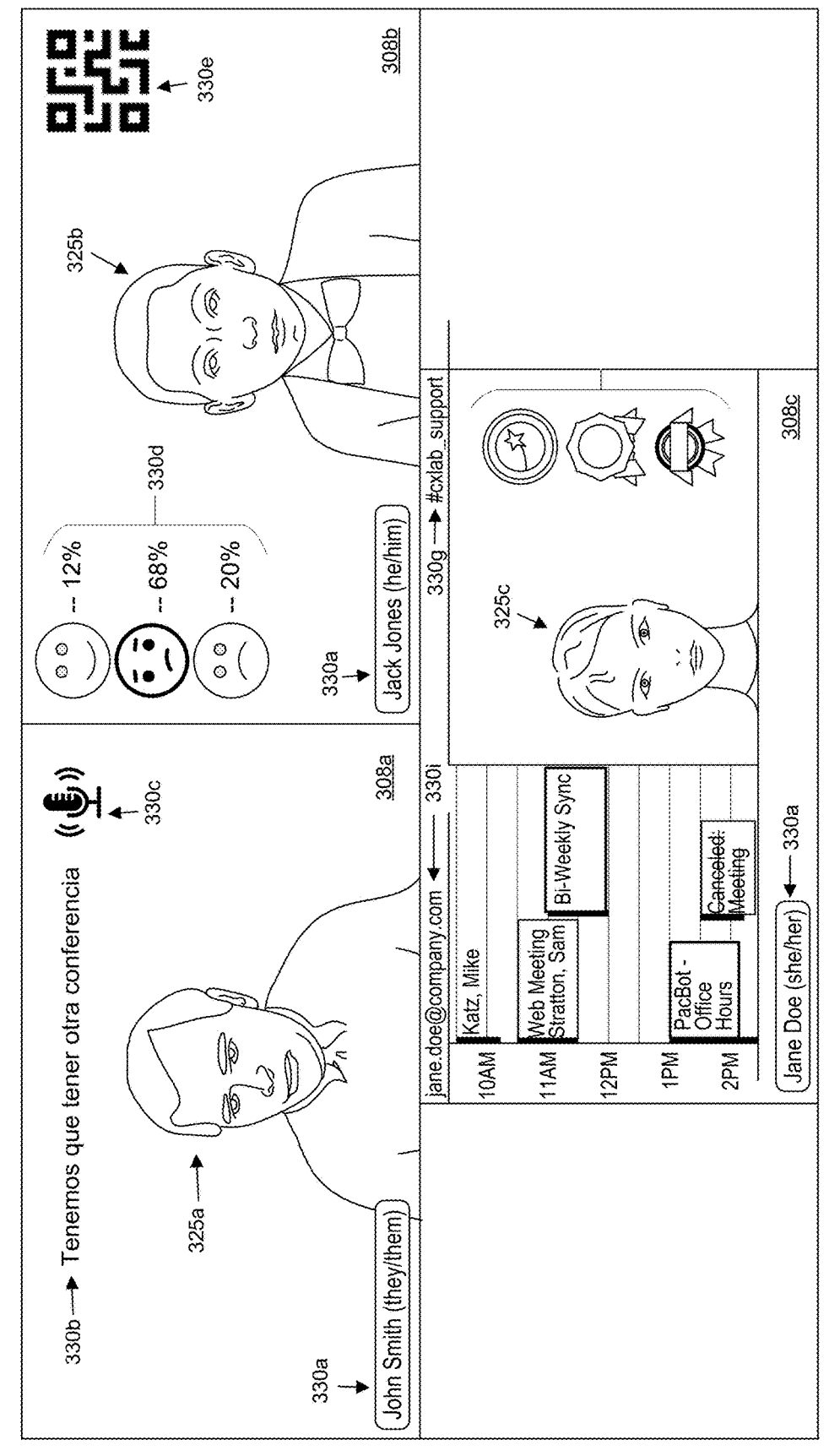
FIG. 3 is a block diagram that illustrates an example videoconference session with example metacommunication channels.

FIG. 3 is a block diagram that illustrates an example videoconference session 300 hosted by a videoconference platform, with example metacommunication channels 308 being streamed to the platform by a metacommunication service. The metacommunication channels 308*a*, 308*b*, and 308*c* are each associated with a member 325*a*, 325*b*, and 325*c* of the videoconference session 300. In the illustrated embodiment, the members 325*a*, 325*b*, and 325*c* are also users of the videoconference metacommunication service. The metacommunication channels 308 are being generated from separate camera inputs that are combined with metacommunicative signals 330 that are associated with each user. The metacommunicative signals that are included in a metacommunication channel for a user can be stored at a metacommunication server that is specific for that user (e.g., a user profile). The metacommunication server can be permanent, or transient (i.e., lasting as long as the videoconference session for which the metacommunication channel is streamed). The metacommunication channels 308 include metacommunicative signals 330. The metacommunicative signals 330 are illustrated as various example metacommunicative signals 330*a*-300*i*. The metacommunication service can include user profiles for each user, and the metacommunicative signals can be generated based on data associated with the user profiles.

Metacommunicative signals 330 can include integrated applications, interactive tools, graphical content, and media to enrich any videoconferencing experience. Interactive tools can include a productivity process 330h, including a calendar, contacts, word processing, or spreadsheet process, and the media can be a static snapshot of the output of the productivity process. Graphical content can include badges 330f. The metacommunication channel can be configurable to include personalized settings informed by a user profile. The personalized settings can include sentiment analysis 330d, automatic speech translation 330b, as well as context recognition to suggest applications and tools to be added or removed from the metacommunication channel 308 dynamically. The metacommunication channels 308a, 308b, and 308c can function independently or as a part of a network. Metacommunicative signals 330 can include the pronunciation of a videoconference member's name (e.g., as phonetic text or as audio media which has been recorded by the videoconference member themselves), the videoconference member's preferred pronouns 330a, the videoconference member's rank and role in a company 330g, and contact information 330i. As an additional example, metacommunicative signals 330 can include live subtitles 330b for speech, sign language, and translated text, as well as text-to-speech automatic decoding 330c for such live subtitles 330b. Text-to-speech of live subtitles would enable videoconference members with a visual impairment who also speak a different language to participate in the same videoconference session.

The technology is platform agnostic because features of the integrated applications 330h and media are integrated into captured video and/or audio, which is included in the videoconference session 300 as the metacommunication channel 308. Moreover, the metacommunicative signals 330 can include a metacommunication server that allows videoconference members 325 to edit the metacommunicative signals associated with a particular user and update the metacommunication channel that is streamed to the videoconference session. The metacommunication server can be accessible by a link, by an image associated with a link, or by a Quick Response (QR) code 330e. The QR code 330e can be specific to the user 325b, to the videoconferencing session 300, or both. The QR code 330e can embed a unique identifier for the videoconference session.

In some embodiments, the metacommunication service grants permission to access the metacommunication server to members 325 who scan the QR code 330e (e.g., with a reader device), or who actuate the link. In further embodiments, the metacommunication service grants permission to edit the metacommunicative signals 330 at the metacommunication server to members 325 who scan the QR code 330e associated with the user 325b and access the metacommunication server. In some embodiments, the metacommunication server comprises a set of trusted identities. In such embodiments, the members 325 are associated with user identities, and permission to access the metacommunication server—and edit the metacommunicative signals stored therein—is granted to members 325 associated with identifiers found to match any of the set of trusted identities following a search. The server can maintain the set of trusted identities.

Editing the metacommunicative signals of the user causes the videoconference session 300 to replace the metacommunication channel 308 with an updated metacommunication channel associated with the user 325 according to those changes made by the editor. The changes become apparent to the members 325 during the videoconference session 300.

In some embodiments, the Network saves an access key that is specific to the editor of the metacommunicative signals, and only streams the updated metacommunication channel to the editor, and the metacommunication channel 308 (i.e., the original metacommunication channel) to the other members 325 of the videoconference session 300. In still further embodiments, the editor selects a subset of the members 325 so to receive the updated metacommunication channel. In such embodiments, metacommunicative signals 330 and metacommunication channels 308 are further tailored for each particular member of a videoconference session (e.g., in such videoconferences where different members speak different languages and require different translation services for the same user).

FIG. 4 is a flow chart that illustrates a method 400 to provide a metacommunication channel for videoconference sessions, independent of platform. The method 400 includes enabling a metacommunication service to assist and enrich a videoconference session for a user device (step 404). In some embodiments, the metacommunication service is hosted by a server of the system (e.g., a metacommunication server) to function across different videoconference platforms. In some embodiments, the metacommunicative service is a cloud service that is accessible by the user device via a wireless telecommunications network.

The method 400 includes generating a video feed that modifies a camera feed (step 408). In some embodiments, the camera feed can be from a device that is associated with the user device (e.g., a webcam). In some embodiments, the camera feed includes an audio feed. In some embodiments, the video feed is referred to as a second camera input and the camera feed is referred to as a first camera output, and the second camera input is based on the first camera output. In some embodiments, the second camera input is a duplicate of the first camera output, and both the second camera input and the first camera output appear as separate video feeds for the user device when it is in a videoconference session.

The method 400 includes generating first metacommunicative signals based on an output of a software application (step 412). In some embodiments, the first metacommunicative signals are generated on the user device, or on the metacommunication service, or both. In some embodiments, the metacommunicative signals are generated at the user device and hosted at the metacommunication server. The software application can run on the cloud or it can run locally on the user device. In some embodiments, the software application is administered independently of a videoconference platform. In some embodiments, the software application includes a machine learning model (e.g., face detection, object detection, sentiment analysis, automatic speech recognition, or machine translation).

The method 400 includes creating a metacommunication channel by combining the video feed with the first metacommunication signals (step 416). The method 400 includes streaming the metacommunication channel to multiple client devices of participants of the videoconference session (step 420). In some embodiments, the videoconference session is a first videoconference session, the first videoconference session being hosted by a first videoconference platform and streaming the metacommunication channel in place of the first camera output to first participant devices of the first videoconference session. In some embodiments, the metacommunication service streams the metacommunication channel to a second videoconference session hosted by a second videoconference platform.

In some embodiments, the method 400 includes updating the metacommunication channel based on second metacommunicative signals (step 424). The second metacommunicative signals can include one or more graphical objects that are administered independently of the videoconference platform. In some embodiments, the method 400 includes enabling a second participant device connected to the videoconference session to access the server of the system and cause the metacommunicative service to generate second metacommunicative signals. In some embodiments, the method 400 includes presenting an updated metacommunication channel at the user device and to multiple client devices of participants of the videoconference session (step 428). In some embodiments, the method 400 includes updating the metacommunication channel based on the first metacommunicative signals and the second metacommunicative signals such that a presentation of the videoconference session at the multiple client devices incorporates the output of the software application and the one or more graphical objects.

Computer System

Figure 5:
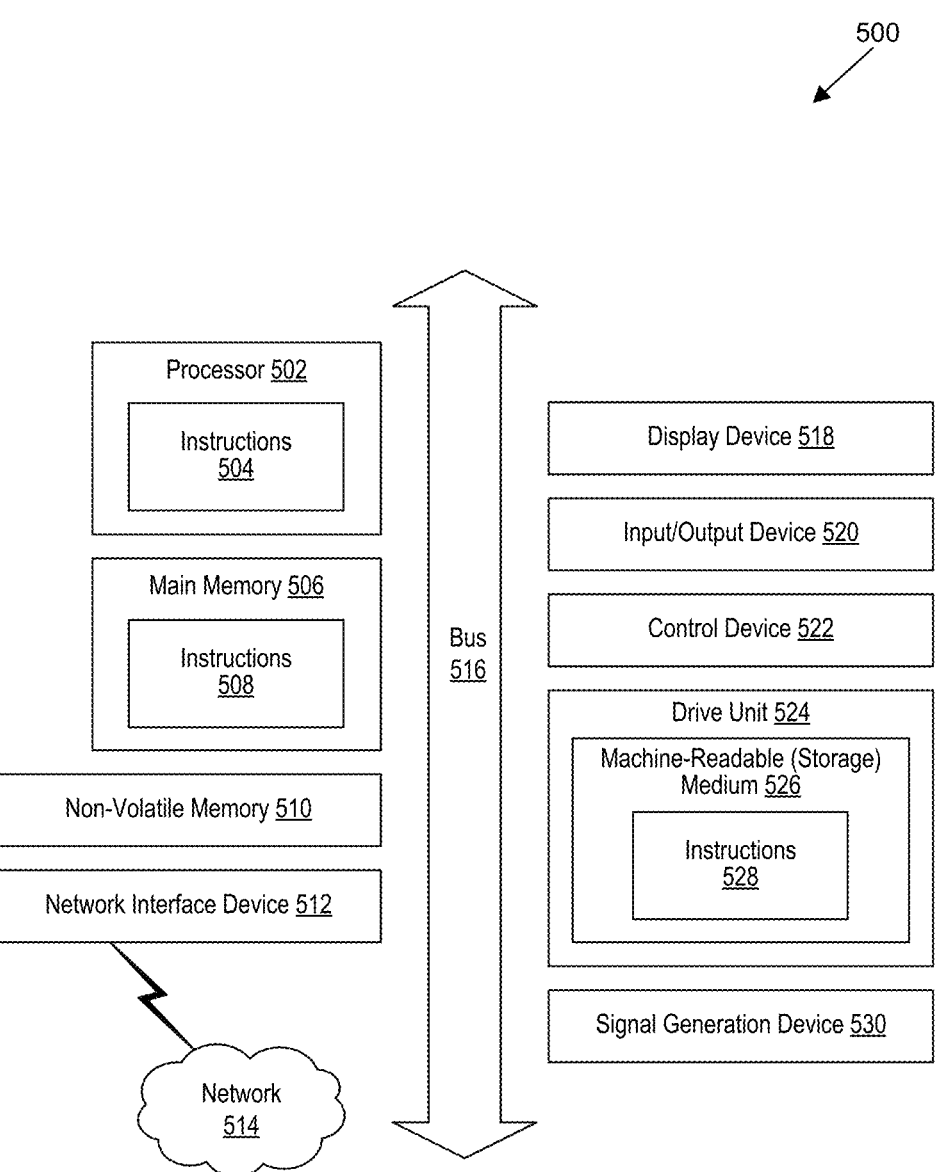
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a meansplus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon, wherein the instructions, when executed by at least one data processor of a system, cause the system to:

enable a metacommunication service to assist and enrich a videoconference session, wherein the metacommunication service is hosted by a server of the system to function across different videoconference platforms;

stream a metacommunication channel to multiple client devices of participants of the videoconference session, wherein the metacommunication channel is configured to generate a media feed that modifies a camera feed of the videoconference session based on metacommunicative signals;

generate first metacommunicative signals based on an output of a machine learning model responsive to input from a first participant device of the videoconference session, wherein the machine learning model is administered independently of a videoconference platform;

enable a second participant device connected to the videoconference session to access the server of the system and cause the metacommunication service to generate second metacommunicative signals, wherein the second metacommunicative signals include one or more graphical objects that are administered independently of the videoconference platform; and update the metacommunication channel based on the first metacommunicative signals and the second metacommunicative signals such that presentation of the videoconference session at the multiple client devices incorporates the output of the machine learning model and the one or more graphical objects.

2. The non-transitory, computer-readable storage medium of claim 1, wherein the system belongs to a wireless telecommunications network, and wherein to update the metacommunication channel comprises causing the system to:

cause the multiple client devices to present a link in the videoconference session, wherein the link, when actuated, grants access to the server to generate metacommunicative signals for the videoconference session.

3. The non-transitory, computer-readable storage medium of claim 2, wherein the system is further caused to:

cause the multiple client devices to present a quick response (QR) code in the videoconference session, wherein the QR code, when scanned with a reader device, grants access to the server to generate metacommunicative signals for the videoconference session.

4. A system configured to provide a metacommunication channel for videoconference sessions, independently of videoconferencing platform, the system comprising:

at least one hardware processor; and at least one non-transitory memory storing instructions, which, when executed by the at least one hardware processor, cause the system to:

enable a metacommunication service for a user device that operates independently of videoconferencing platform;

instantiate a second camera input based on a first camera output of the user device, wherein the second camera input is separate from the first camera output;

generate metacommunicative signals, the metacommunicative signals being associated with the user device and including at least one of:

an output of a process, one or more graphical content administered by the metacommunication service, a quick response (QR) code associated with a link to a metacommunication server;

host the metacommunicative signals at the metacommunication server;

generate the metacommunication channel associated with the user device by combining the metacommunicative signals and the QR code with the second camera input;

cause a first videoconference session hosted by a first platform to present the QR code to first participant devices of the first videoconference session by streaming the metacommunication channel in place of the first camera output; and grant permission to access the metacommunication server to the first participant devices of the first videoconference session.

5. The system of claim 4 further caused to:

cause a second videoconference session hosted by a second platform to stream the metacommunication channel in place of the first camera output, wherein the metacommunication channel is streamed to second participant devices of the second videoconference session.

6. The system of claim 4 further caused to:

grant permission to a participant device of the first participant devices to access the metacommunication server and edit the metacommunicative signals; and cause the first videoconference session to change the metacommunication channel according to changes made by a participant associated with the participant device, such that the changes are presented to the first participant devices during the first videoconference session.

7. The system of claim 6, wherein to grant permission to the participant device to access the metacommunication server further causes the system to:

provide a link to the first participant devices, wherein the link provides access to the metacommunication server and also grants permission to update the metacommunicative signals.

8. The system of claim 7, wherein providing the link further causes the system to:

grant permission to update the metacommunicative signals to the first participant devices upon accessing the metacommunication server.

9. The system of claim 8, wherein the metacommunication server comprises a set of trusted identities associated with user identities, and wherein granting permission to update the metacommunicative signals further causes the system to:

search the set of trusted identities for the user identities of the first participant devices that access the metacommunication server; and grant permission to update the metacommunicative signals to members of the first participant devices that are associated with user identities found in the set of trusted identities.

10. The system of claim 4, wherein the metacommunication service comprises user profiles, and wherein the user profiles comprise a user profile associated with a user of the user device, and wherein the metacommunicative signals are generated based on data associated with the user profile.

11. The system of claim 4, wherein the process comprises a machine learning model, and wherein generating the metacommunicative signals causes the system to:

provide the second camera input as an input to the machine learning model;

determining the output of the machine learning models based on changes in the second camera input to produce responsive metacommunicative signals; and update the metacommunication channel to cause display of the responsive metacommunication signals.

12. The system of claim 4, wherein the process comprises a productivity process including a calendar, contacts, word processing, or spreadsheet process, and the output is a static snapshot of the output of the productivity process.

13. The system of claim 4, wherein the user device is coupled to a camera and a microphone, and wherein generating the metacommunicative signals comprises causing the system to:

process data captured by the microphone, wherein the data comprises speech in a first language; and translate the speech to a second language; and cause to display the speech in the second language as part of the metacommunication channel.

14. A method to provide a metacommunication channel for videoconference sessions, independent of videoconference platforms that host the videoconference sessions, the method comprising:

generating a metacommunicative media feed that augments media captured for a videoconference session with metacommunicative signals that are generated by a metacommunication service independent of a videoconference platform that hosts the videoconference session;

obtaining the metacommunicative signals including a unique identifier for the videoconference session with a link to a server that hosts the metacommunication service, and at least one of:

an output of a process, or graphical content; and streaming the metacommunication channel including the metacommunicative media feed to participant devices of the videoconference session, wherein the videoconference session presents the metacommunication channel with the link in place of the media captured for the videoconference session; and granting access to the server based on an indication of the unique identifier matching the videoconference session.

15. The method of claim 14 further comprising:

causing a second videoconference session hosted by a second videoconference platform to stream the metacommunication channel including the metacommunicative media feed to second participant devices of the second videoconference session.

16. The method of claim 14 further comprises:

enabling the participant devices of the videoconference session to modify the metacommunication channel based on inputs at respective participant devices; and in response to the inputs at the respective participant devices, causing the metacommunication service to incorporate additional metacommunicative signals for the videoconference session in the metacommunication channel.

17. The method of claim 14, wherein the metacommunicative signals include a quick response (QR) code that embeds the unique identifier and the link, wherein the server maintains a set of trusted identities, the method further comprising:

causing the participant devices to present the QR code to participants in the videoconference session; and granting access by a participant of the videoconference session to the server based on an identifier of the participant matching any of the set of trusted identities.

18. The method of claim 14, wherein the metacommunication service maintains user profiles for users of videoconference platforms, and wherein the metacommunicative signals are generated based on the user profiles.

19. The method of claim 14, wherein the process comprises one or more machine learning models, and wherein generating the metacommunicative signals comprises:

providing the media captured for the videoconference session as an input to the one or more machine learning models;

determining the output of the machine learning models based on changes in the media captured for the video-conference session to produce responsive metacommunicative signals; and updating the metacommunication channel to present media based on the responsive metacommunicative signals.

20. The method of claim 14, wherein the output of the process is a static snapshot of a productivity software application and relates to a calendar, contacts, word processing, or spreadsheet process.

\* \* \* \* \*